United States Patent [19]

Jones

[11] Patent Number: 5,520,071
[45] Date of Patent: May 28, 1996

[54] STEERING WHEEL CONTROL ATTACHMENT APPARATUS

[75] Inventor: Michael B. Jones, Excelsior, Minn.

[73] Assignee: Crow River Industries, Incorporated, Minneapolis, Minn.

[21] Appl. No.: 315,563

[22] Filed: Sep. 30, 1994

[51] Int. Cl.$^6$ .................................................. B62D 1/04
[52] U.S. Cl. ................................................... 74/557
[58] Field of Search .............................. 74/557; 24/339, 24/336, 136 K, 134 L, 115 K

[56] References Cited

U.S. PATENT DOCUMENTS

| 1,861,586 | 7/1932 | Shipley | 74/557 |
| 5,289,736 | 3/1994 | Fujimori | 74/557 |

OTHER PUBLICATIONS

"Disabled Driving Aids" brochure, Driving Specialties, Ltd., (1 page), (published before the filing date of this case).
"M.P.D. Hand Controls" brochure, Mobility Products & Design, Inc., pages), (published before the filing date of this case).

Primary Examiner—Rodney H. Bonck
Assistant Examiner—Mary Ann Battista
Attorney, Agent, or Firm—Merchant, Gould, Smith, Edell, Welter & Shmidt

[57] ABSTRACT

A hand control attachment apparatus, for attaching a hand control member to a steering wheel or the like. A web is extended from a housing of the hand control attachment apparatus. The web member cooperates with an outer surface of the housing so as to secure the hand control attachment apparatus onto the steering wheel or the like. A first end of the web member is secured in a slot of a rotatable bar member which is received in the housing. A second end of the web member loops around a rod which is removably received in the housing. The web member is wound onto the bar member by rotating the bar member so as to tightly secure the hand control attachment apparatus onto the steering wheel or the like. The apparatus is released from the steering wheel by releasing the web member and removing the rod out of the looped end of the web member and the housing. The hand control member is mounted on the housing of the hand control attachment apparatus by a spring member, so as to form a hand control device.

17 Claims, 4 Drawing Sheets

STEERING WHEEL CONTROL ATTACHMENT APPARATUS

FIELD OF THE INVENTION

The present invention relates to a hand control attachment apparatus used on a steering wheel or the like.

BACKGROUND OF THE INVENTION

Handicapped drivers, such as paraplegics, amputees, arthritics, etc., often require a hand control device attached to a steering wheel in order to operate an automobile comfortably and safely.

Hand control devices take on varying configurations and functions depending on the nature of the person's handicap. For example, there are hand controls for control of the steering wheel, gas pedal, brake, horn, lights, etc. Indeed, there are hand controls for most every type of control required while driving a vehicle.

Hand control devices are often time consuming to install and attach to the steering wheel and once installed are often difficult to remove.

There is a need for a hand control attachment apparatus which allows quick, easy attachment and removal from a steering wheel and which can be used with any number of different hand control devices. The present invention provides such a hand control attachment.

SUMMARY OF THE INVENTION

The present invention relates to a hand control attachment apparatus used on a steering wheel or the like which allows hand control devices to be mounted on the steering wheel by use of the hand control attachment apparatus.

In one embodiment of the present invention, a hand control attachment apparatus is tightly secured on the steering wheel.

In one embodiment, the present invention relates to a hand control attachment apparatus for attaching a hand control member to a steering wheel or the like. The hand control attachment apparatus includes:

a housing having an outer surface adapted to a shape of the steering wheel;

a rod, having first and second ends, being received in the housing;

a web member having first and second ends, the first end being looped around the rod;

winding means, mounted on the housing, for winding the web member onto the winding means, a length of the web member between the winding means and the rod being adjustable by winding the winding means;

locking means for locking the winding means, the locking means being mounted on the housing; and wherein the outer surface of the housing and the web member cooperate with each other to secure the hand control attachment apparatus to the steering wheel.

Further in one embodiment, the housing has a cavity opening toward the outer surface of the housing. The rod and the winding means longitudinally pass through the open cavity. The web member between the rod and the winding means extends from the open cavity.

Still in one embodiment, the winding means includes a bar member being received in the housing. The bar member has a slot. The second end of the web member is secured in the slot, so as to allow the winding means to wind the web member onto the bar member. The winding means includes a ratchet assembly having teeth at a peripheral edge. The locking means cooperates with the ratchet assembly so as to lock the winding means in a locking position.

Yet in one embodiment, an end of the bar member has at least one end exposed for operative engagement with a winding tool. In one embodiment, the winding tool is an allen wrench. The winding tool is operated outside the housing so that the winding tool winds the winding means to adjust the length of the web member. The winding tool is either manually operated by an operator or automatically operated by a machine.

Still in one embodiment, the hand control member is mounted on the housing by a mounting means. The mounting means includes a bore extending through the housing and a spring member which is bent at both first and second ends and includes apertures at each end. The spring member is inwardly biased across the housing from a top side of the housing which is perpendicular to the outer surface of the housing, to a bottom side of the housing which is also perpendicular to the outer surface of the housing. The aperture at the bottom end of the spring member is biased somewhat out of alignment with the bore through the housing while the aperture at the top end of the spring member is retained in alignment with the bore of the housing. Accordingly, as a shaft of the hand control member is inserted through the bore, the bottom end of the spring member engages a groove disposed on the shaft of the hand control member so as to secure the hand control member on the housing. A distal end of the shaft of the hand control member is tapered, so that when the shaft is inserted through the aperture at the bottom end of the spring member, the misaligned spring member is biasedly pushed toward the outer surface of the housing by the tapered distal end of the shaft. Then the spring member snaps into the groove to retain the shaft on the housing and thus to retain the hand control member on the hand control attachment apparatus.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters generally indicate corresponding parts throughout the following several views.

DETAILED DESCRIPTION OF THE PREFERRED EMBODIMENT

Figure 1:
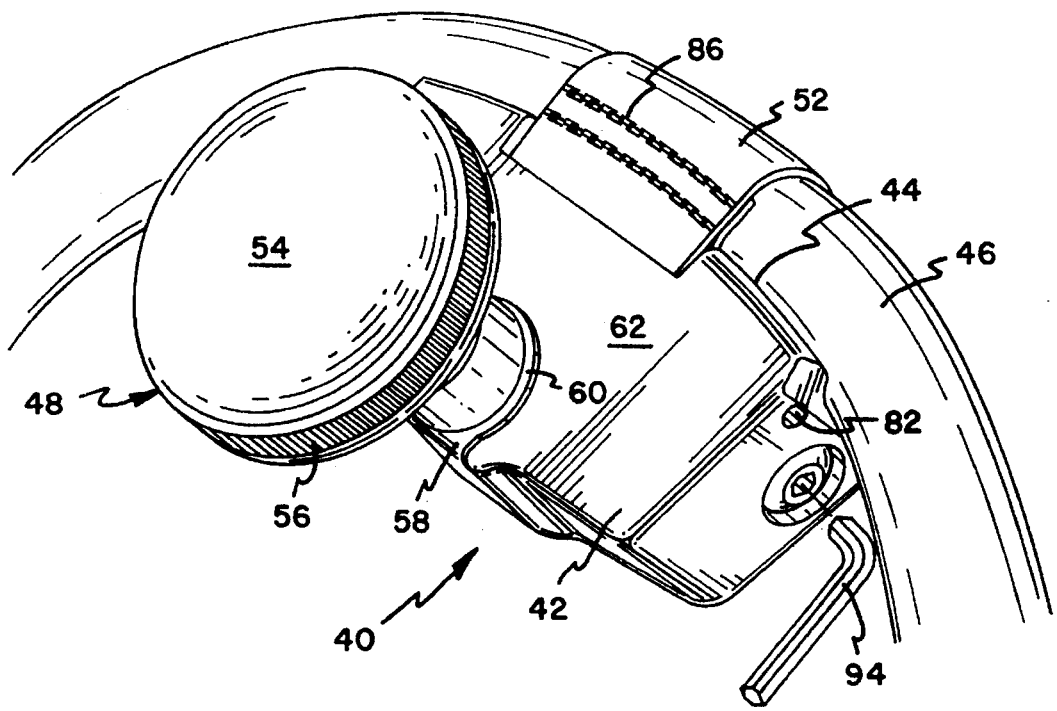
FIG. 1 is a perspective view of an embodiment of a hand control attachment apparatus, which is secured on a steering wheel as partially shown, in accordance with the principles of the present invention, and a hand control member is mounted on the hand control attachment apparatus.

Referring now to the drawings in details, wherein like numerals identify similar elements throughout, FIG. 1 shows a perspective view of an embodiment of a hand control attachment apparatus 40 in accordance with the principles of the invention. In FIG. 1, a hand control member 48 is removably mounted on the hand control attachment apparatus 40.

Figure 5:
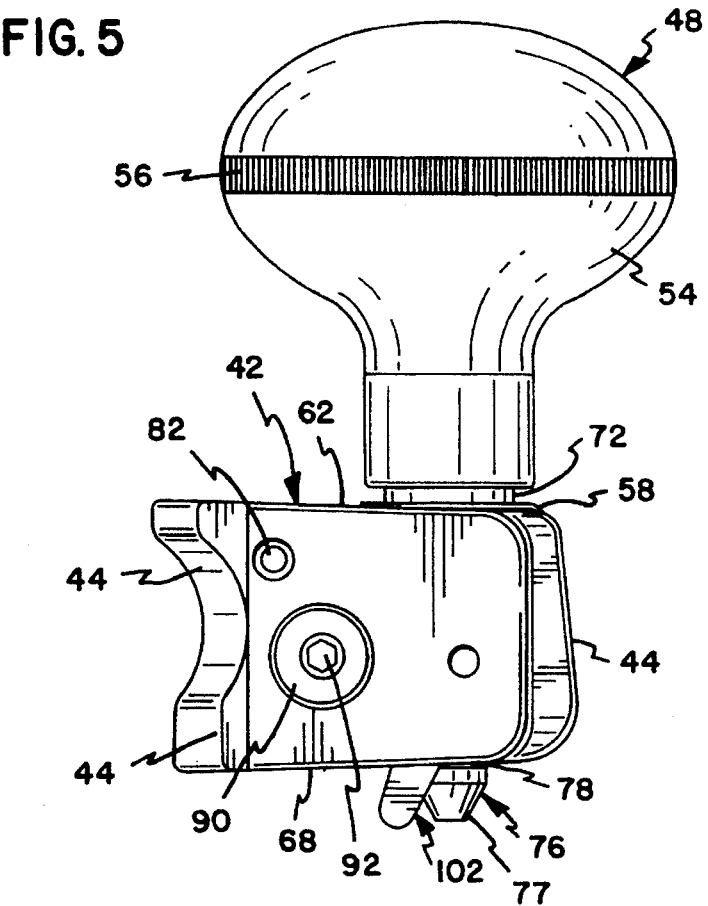
FIG. 5 is an elevated side view of the hand control attachment apparatus and the hand control member, but having a web member removed.

The apparatus 40 includes a housing 42 having an outer surface 44, which is more clearly shown in FIG. 5. The outer surface 44 is configured to adapt to the outer shape of a steering wheel 46 which has a curved shape as shown in FIG. 1. Accordingly, the outer surface 44 has a curved shape. It will be appreciated that the outer surface of the housing can take on other configurations so as to fit with different shaped steering wheels and other structures.

As shown in FIGS. 1–4, a web member 52 extends from the housing 42 and loops around the steering wheel 46. The size of the loop of the web member 52 is adjustable to enable tightly securing the steering wheel 46 between the web member 52 and the outer surface 44 of the housing 42.

The hand control member 48 has a head portion 54, which in the embodiment shown has a knurled peripheral edge 56 so as to facilitate grasping of the hand control member 48.

Figure 4:
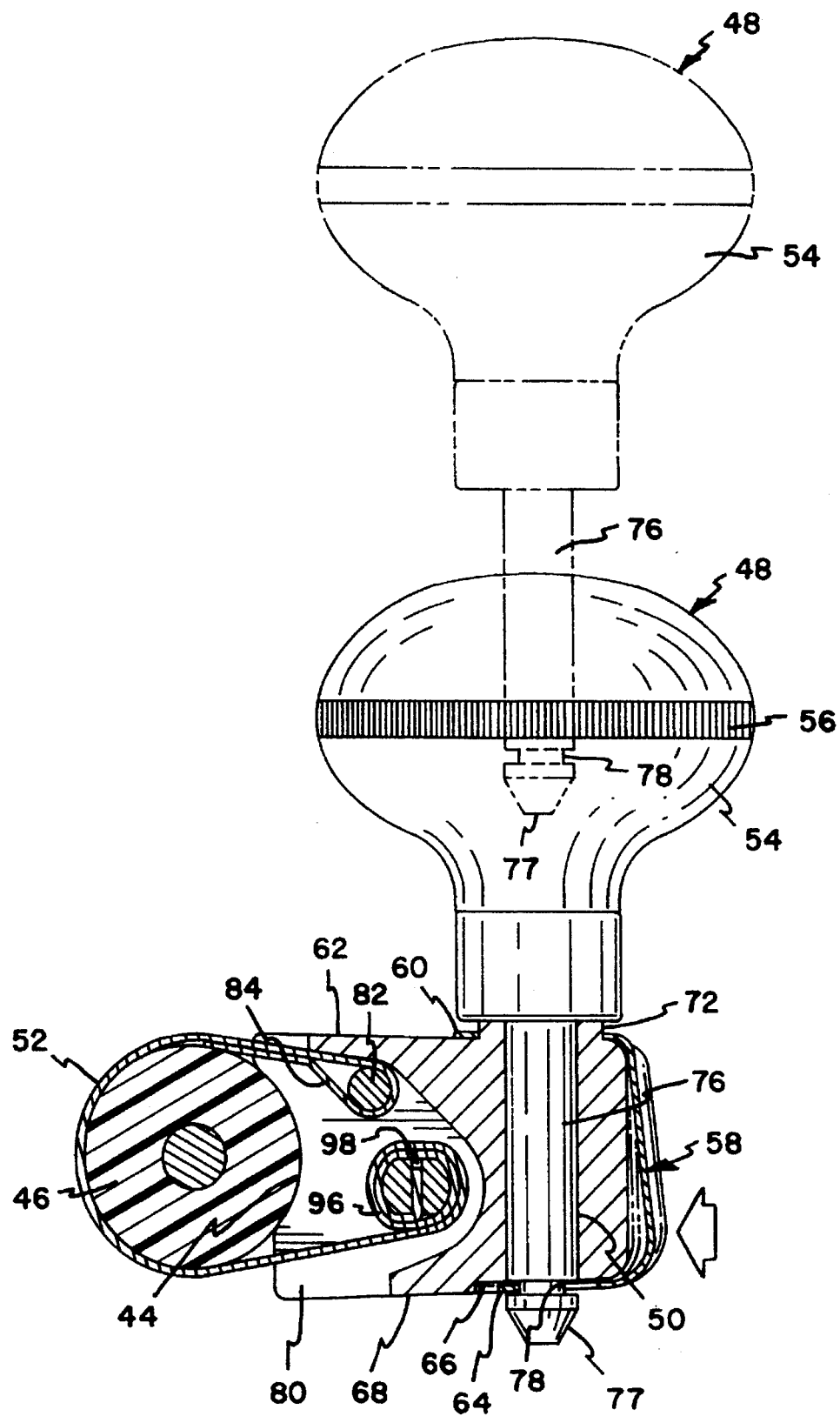
FIG. 4 is a cross-sectional view of the hand control attachment apparatus as shown in line 4—4 of FIG. 2 with the hand control member shown removed in phantom line.
Figure 6:
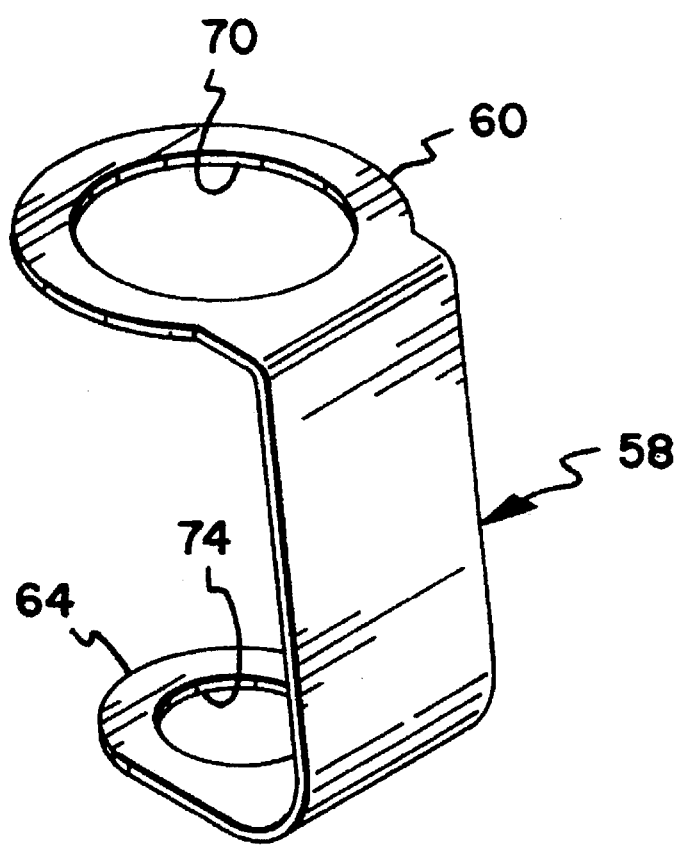
FIG. 6 is a perspective view of a spring member used in the embodiment of the hand control attachment apparatus shown in FIG. 1.

Still in FIGS. 1 and 4, a spring member 58 assists in mounting the handle control member 48 onto the housing 42. A top end 60 of the spring member 58, as shown in FIG. 6, is bent substantially at a right angle toward a top side 62 of the housing 42. A bottom end 64 of the spring member 58 is bent substantially at a right angle and is received in a recess 66 of the housing 42 which is disposed on the opposite side 68 of the housing 42.

As shown in FIG. 6, the top end 60 of the spring member 58 has an opening 70. Edges of the opening 70 are engaged by a projecting portion 72 of the housing 42 as shown in FIGS. 4 and 5. The projecting portion 72 of the housing 42 is disposed at one end of a bore 50 extending through the housing 42. The projecting portion 72 of the housing 42 retains the opening 70 of the spring member 58 in alignment with the bore 50. The bottom end 64 of the spring member 58 has an opening 74. The opening 74 is biased out of alignment with the bore 50. The opening 74 can be aligned with the bore 50 by forcing the spring member 58 toward the housing 42.

As shown in FIG. 4, a shaft 76 of the hand control member 48 is inserted into the bore 50. A circular groove 78 of the shaft 76 is disposed proximate a distal end 77 of the shaft 76 so as to be disposed outside the housing 42 proximate the recess 66 upon insertion of the shaft 76 completely into the housing 42. As the shaft 76 is pushed out the housing 42 proximate the recess 66, the shaft 76 projects through the opening 74 in the bottom end 64 of the spring member 58 and forces the spring member 58 toward the housing 42 such that the opening 74 is aligned with the shaft. The spring member 58 then snaps into the circular groove 78 to retain the shaft 76 in the housing 42 and thus the hand control member 48 on the hand control attachment apparatus 40.

The distal end 77 of the shaft 76 is tapered, so that when the shaft 76 is inserted through the opening 74 of the bottom end 64 of the spring member 58, the misaligned spring member 58 is biasedly pushed toward the outer surface 44 of the housing 42 by the tapered distal end 77 of the shaft 76.

To release the hand control member 48 from the housing 42, the spring member 58 is forced toward the housing 42 by a force shown by an arrow in FIG. 4 so as to cause alignment of the opening 74 of the spring member 58 with the bore 50, whereby the shaft 76 of the hand control member 48 is released by the spring member 58 and the shaft 76 can be removed from the bore 50 of the housing 42. Accordingly, the spring member 58 cooperates with the housing 42 to enable quick attachment and detachment of the hand control member 48 on the hand control attachment apparatus 40 without the use of any tools. To attach the hand control member 48, the user simply pushes the shaft 76 into the bore 50 of the housing 42 until the spring member 58 snaps into place about the circular groove 78. The hand control member 48 is then removed by simply pushing the spring member 58 and pulling up on the hand control member 48.

Figure 2:
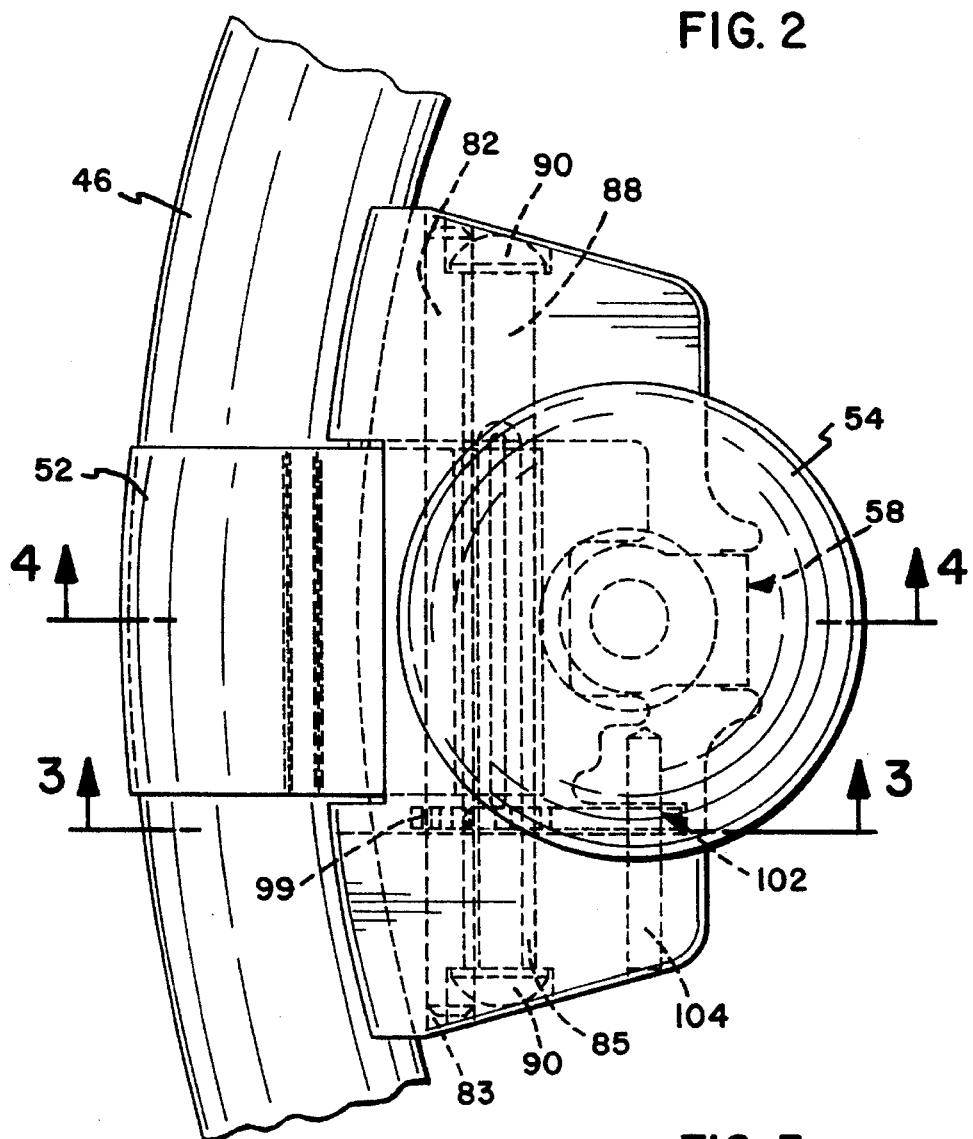
FIG. 2 is a top plane cross-sectional view of the hand control attachment apparatus and the hand control member as shown in FIG. 1.
Figure 3:
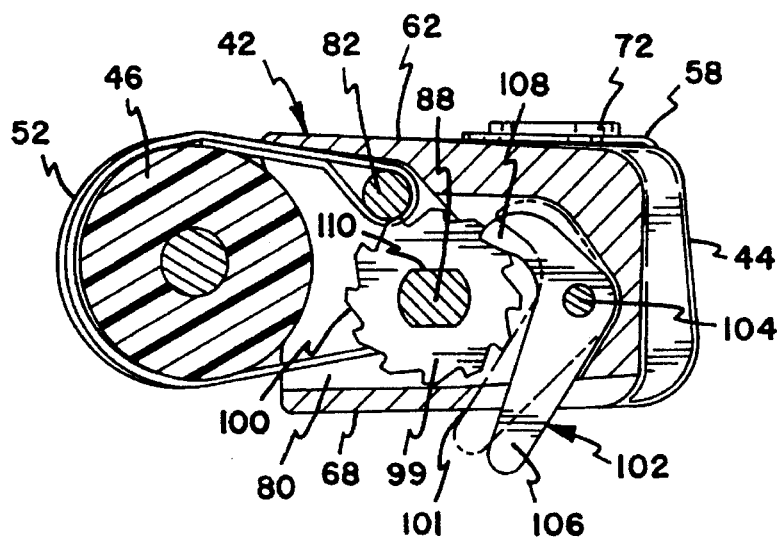
FIG. 3 is a cross-sectional view of the hand control attachment apparatus as shown in line 3—3 of FIG. 2, with the hand control member removed, wherein lock means is disposed both in a lock position (a solid line) and a release position (a phantom line).

As shown in FIGS. 3, 4 and 2, an open cavity 80 is disposed in the housing 42. The open cavity 80 opens towards the outer surface 44 of the housing 42. The web member 52 extends from the housing 42 to receive the steering wheel 46. A longitudinal rod 82 is slip fit into a bored hole 83 which passes through the open cavity 80 and the housing 42. Thus, it is easily removable without the use of tools, i.e. after tension on the web member 52 is released, the rod 82 may be pushed out by using an Allen wrench or any device which fits into the bored hole 83. It is appreciated that the rod 82 can also be suitably and removably mounted in the housing 42. A first end portion 84 of the web member 52 loops around the rod 82 in the open cavity 80. The first end portion 84 of the web member 52 is attached to the rod 82 by any suitable method, for example, by inserting the rod 82 through a loop of the web member 52 which is formed by sewing the first end portion 84 of the web member 52 onto itself as indicated by a seam 86 shown in FIG. 1.

Further in FIGS. 3, 4 and 2, there is shown a longitudinal bar member 88. The bar member 88 is disposed in a second bored hole 85 which also passes through the open cavity 80 and the housing 42. The bar member 88 is received in the housing 42. At least one end 92 of the bar member 88 is operatively configured for attachment to a winding tool 94 such as an Allen wrench as illustrated in FIG. 1. One end of the winding tool 94 is fitted to the end 92 so that when the winding tool 94 is wound by either an operator's hand or an automatic machine, the bar member 88, is wound accordingly.

A second end portion 96 of the web member 52 is secured in a longitudinal slot 98 of the bar member 88. Accordingly, as the bar member 88 is rotated by using the winding tool 94, the web member 52 proximate the end portion 96 is wound onto the bar member 88. Thus, the length of the web member 52 between the rod 82 and the bar member 88 is adjusted by rotating the bar member 88 with the winding tool 94. The steering wheel 46 is, therefore, tightly secured between the web member 52 and the outer surface 44 of the housing 42.

When the rod 82 is detachably mounted on the housing 42, the first end portion 84 of the web member 52 is releasable from the rod 82, and the second end portion 96 of the web member 52 is not releasable from the slot 98 of the bar member 88. The second end portion 96 of the web member 52 is inserted into the slot 98 and suitably secured, such as by melting the end of the web member 52, as to not allow the web member 52 to slip out under tension. The web member 52 may be replaced via remelting the second end portion 96 or cutting the web member 52 free. Thus, the web member 52 can be replaced by a new web member having a different configuration and characteristics as desired.

In FIG. 3, there is shown a ratchet member 99 which is suitably mounted on the bar member 88 for rotation therewith. A peripheral edge 100 of the ratchet member 99 has a series of locking teeth. A locking member 102 is mounted in the housing 42 through a pivot pin 104. A first end 106 of the locking member 102 extends from a bottom side 68 of the housing 42 through an opening 101. A second end 108 of the locking member 102 projects into engagement with the peripheral edge 100 of the ratchet member 99. Accordingly, the second end 108 of the locking member 102 normally engages with the teeth of the ratchet member 99 so as to stop the rotation of the ratchet member 99.

Further as shown in FIG. 3, the locking member 102 releases the ratchet member 99 and thus the bar member 88 when the locking member 102 is pivoted from a locking position as shown in a solid line to an unlocking position as shown in a phantom line whereby the locking member 102 no longer engages with the ratchet member 99. The opening 101 is designed to allow the first end 106 of the locking member 102 to move between the locking and unlocking positions.

The locking member 102 has an L-shape wherein the second end 108 which is disposed in the housing 42 is at the shorter arm of the L-shape in the housing 42, and the first end 106 which extends from the opening 101 of the housing 42 is at the larger arm of the L-shape. A user simply pulls or pushes the first end 106 to lock or release the ratchet member 99. Once the ratchet member 99 is released, the user can simply pull on the web member 52 to adjust the placement of the hand control attachment apparatus 40 on the steering wheel 46 or push out the rod 82 to release the web member 52 and allow the apparatus 40 to be removed.

The bar member 88 preferably has a cylindrical shape. The bar member 88 also has a flat portion 110 so as to receive and position the ratchet member 99 on the bar member 88 for rotation with the bar member 88. Accordingly, the ratchet member 99 is rotated by the bar member 88, and the bar member 88 and the ratchet member 99 are locked by the locking member 102.

In installing the apparatus 40 onto the steering wheel 46, the second end 96 of the web member 52 is permanently mounted to the slot 98. The web member 52 is looped around the steering wheel 46, and the first end 84 of the web member 52 is aligned with the bored hole 83. Next, the rod 82 is inserted through the bored hole 83 as well as the first end 84 of web member 52. Then, the bar member 88 is rotated by the winding tool 94 so as to wind the second end portion 96 of the web member 52 onto the bar member 88. Accordingly, the steering wheel 46 is tightly secured between the outer surface 44 of the housing 42 and the web member 52.

To release the apparatus 40 from the steering wheel 46, the bar member 88 is released by pushing the locking member 102 and pulling on the web member 52. The winding tool 94 can also be used to facilitate the removal of the web member 52 by counter-rotating the bar member 88 so as to loosen the web member 52. Next, the rod 82 is pushed out of the bored hole 83 of the housing 42 and the first end 84 of the web member 52 by a finger or a tool. Accordingly, the web member 52 is disengaged from the steering wheel 46.

In mounting the hand control member 48 onto the hand control attachment apparatus 40, the shaft 76 of the hand control member 48 is inserted into the bore 50 of housing 42. The spring member 58 is forced toward the housing 42 as the distal end 77 of the shaft 76 projects through the bottom opening 74 of the spring member 58. Upon completely inserting the shaft 76, the bottom end 74 of the spring member 58 biasedly engages the circular groove 78 of the shaft 76 to retain the shaft 76 in the housing 42. To remove the hand control member 98 from the hand control attachment apparatus 40, the spring member 58 is simply forced toward the housing 42 and the shaft 76 removed from the housing 42.

It will be appreciated that alternate embodiments in keeping with the principles of the present invention might be utilized. It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts, within the principles of the invention, to the full extent indicated by the broad general meaning of the terms in which the appended claims are expressed.

What is claimed is:

1. An apparatus having a control member attachable to a steering device, comprising:

a housing having an outer surface adapted to a shape of the steering device;

a rod, having first and second ends, being received in the housing;

a web member having first and second ends, the first end of the web member being looped around the rod;

winding means, mounted on the housing, for winding the web member onto the winding means, a length of the web member between the winding means and the rod being adjustable by winding the winding means;

locking means for locking the winding means, the locking means being mounted on the housing;

wherein the outer surface of the housing and the web member cooperate with each other to secure the apparatus to the steering device; and wherein the winding means includes a rotatable bar member being removably received in the housing, the rotatable bar member having a slot, the second end of the web member being secured in the slot, whereby as the rotatable bar member is rotated, the web member is wound onto the rotatable bar member.

2. An apparatus according to claim 1, wherein the housing defines an open cavity.

3. An apparatus according to claim 2, wherein the rod and the winding means are longitudinally disposed through the open cavity.

4. An apparatus according to claim 2, wherein the web member between the rod and the winding means extends from the open cavity.

5. An apparatus according to claim 1, wherein the control member has a head portion and a shaft, the shaft having a distal end.

6. An apparatus according to claim 1, wherein the winding means includes a ratchet member having teeth at a peripheral edge, the locking means being engageable with the teeth of the ratchet member for locking the winding means.

7. An apparatus according to claim 1, wherein the rotatable bar member of the winding means includes means for receiving a winding tool.

8. An apparatus according to claim 1, wherein the rotatable bar member is a longitudinal bar member.

9. An apparatus according to claim 1, wherein the rod is a longitudinal rod member.

10. An apparatus having a control member attachable to a steering device, comprising:

a housing having an outer surface adapted to a shape of the steering device;

a rod, having first and second ends, being received in the housing;

a web member having first and second ends, the first end of the web member being looped around the rod;

winding means, mounted on the housing, for winding the web member onto the winding means, a length of the web member between the winding means and the rod being adjustable by winding the winding means;

locking means for locking the winding means, the locking means being mounted on the housing;

wherein the outer surface of the housing and the web member cooperate with each other to secure the apparatus to the steering device;

means for mounting the control member on the housing, the mounting means including a bore extending through the housing and a spring member; and the spring member is bent at first and second ends, the first end of the spring member extending along a top side of the housing and the second end of the spring member extending along a bottom side of the housing.

11. An apparatus according to claim 10, wherein the first end of the spring member has an opening being disposed about a projecting member at one end of the housing, the second end of the spring member having an opening being disposed in a recess of the housing proximate to the other end of the housing, the opening of the second end of the spring member being biased partially out of alignment with the housing.

12. An apparatus according to claim 11, wherein the control member has a head portion and a shaft, the shaft passing through the housing, the shaft having a distal end, the distal end extending from the housing.

13. An apparatus according to claim 12, wherein the distal end is tapered, the tapered distal end biasedly engaging with the opening of the second end of the spring member, so that the spring member is pushed toward the housing when the tapered distal end passes through the opening of the second end of the spring member.

14. An apparatus according to claim 13, wherein the shaft has a groove disposed adjacent the tapered distal end of the shaft, wherein the second end of the spring member biasedly snaps into the groove.

15. A method of releasing an apparatus from a steering device, comprising the steps of:

pushing a locking member of the apparatus away from a bar member of the apparatus so as to allow the bar member to be rotatable;

rotating the bar member by use of a winding tool, such that a web member is loosened from a rod, the rod being attachably received in a housing, a first end of the web member being attached to the bar member, a second end of the web member being looped around the rod;

pushing the rod out of the housing and out of the second end of the web member; and disengaging the steering device from the web member and the housing through the second end of the web member.

16. A method of releasing an apparatus from a steering device, comprising the steps of:

pushing a locking member of the apparatus away from a bar member of the apparatus, the bar member being received in a housing of the apparatus and securing a first end of a web member;

pulling the web member to loosen the web member from a rod, the rod being detachably received in the housing, a second end of the web member being looped around the rod;

pushing the rod out of the housing and out of the second end of the web member; and disengaging the steering device from the web member and the housing through the second end of the web member.

17. A method of attaching an apparatus to a steering device, comprising the steps of:

positioning a housing of the apparatus, having an outer surface contoured to correspond to an outer surface of the steering device, proximate the steering device;

extending a looped end of a web member from the housing around the steering device;

inserting a rod into a bore of the housing and the looped end of the web member which is proximate the bore of the housing;

rotating a bar member, which is received in the housing and secures a second end of the web member, by use of a winding tool, such that the web member is wound onto the bar member, wherein a length of the web member is adjustable, and the outer surface of the housing and the web member cooperate with each other to secure the apparatus onto the steering device; and pulling a locking member to lock the bar member, so that the web member tightly secures the apparatus on the steering device.

* * * * *